Jan. 16, 1940.  A. A. LANE  2,187,659
MECHANICAL MOVEMENT
Filed Dec. 3, 1938  4 Sheets-Sheet 1

Inventor
Abbot A. Lane,
By A. M. Houghton
his Attorney

Jan. 16, 1940.  A. A. LANE  2,187,659
MECHANICAL MOVEMENT
Filed Dec. 3, 1938  4 Sheets-Sheet 3
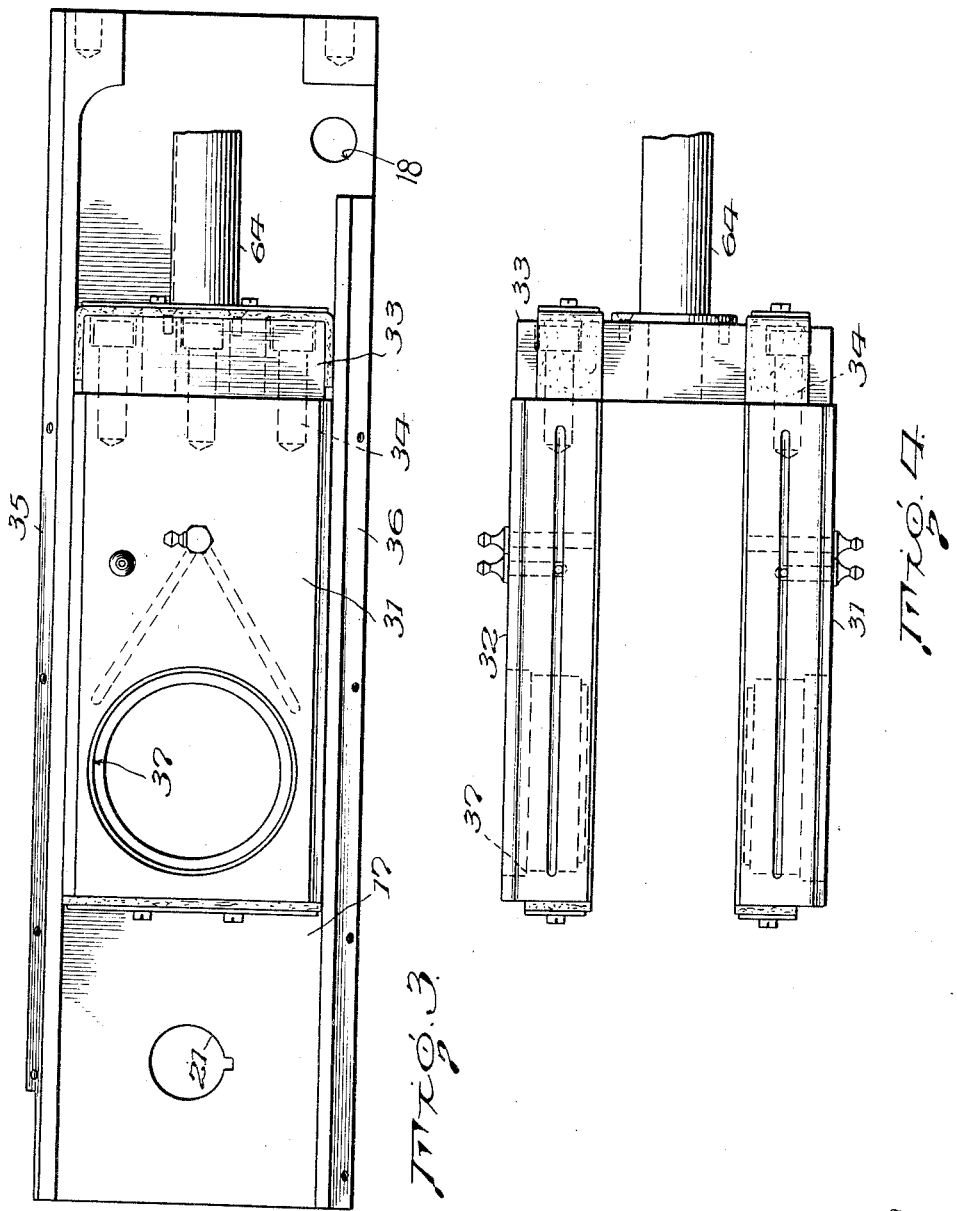
Inventor
Abbot A. Lane,
By A. M. Houghton
his Attorney

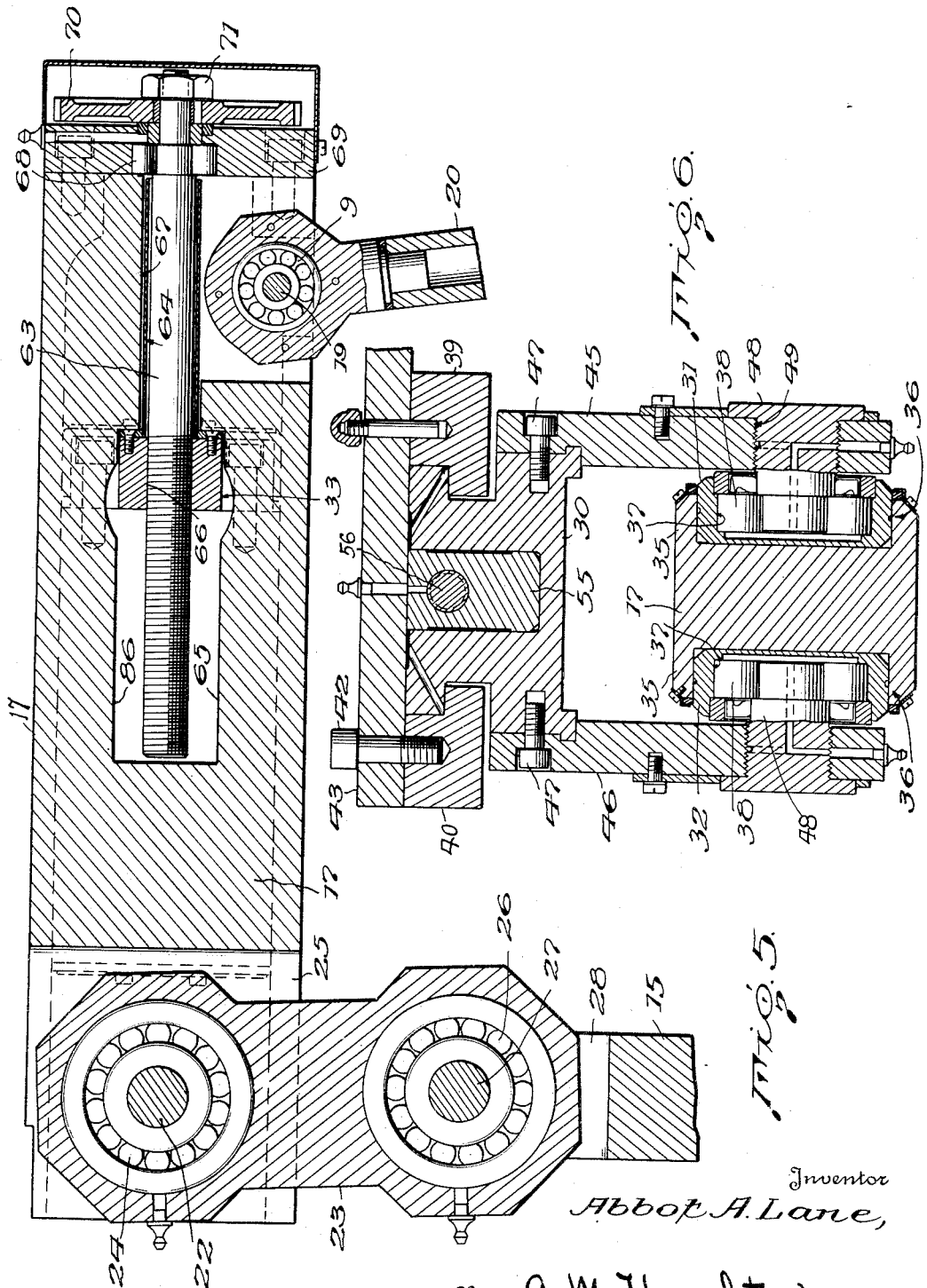

Patented Jan. 16, 1940

2,187,659

UNITED STATES PATENT OFFICE 2,187,659

MECHANICAL MOVEMENT

Abbot A. Lane, Pittsburgh, Pa., assignor to Gulf Research & Development Company, Pittsburgh, Pa., a corporation of Delaware Application December 3, 1938, Serial No. 243,851

9 Claims. (Cl. 74—522)

This invention or discovery relates to mechanical movements; and it comprises a mechanical movement particularly adapted for application to pumps, including a lever or walking beam, a fixed support, means movable with respect to the support and with respect to the beam in a direction lengthwise of the beam and constructed and arranged to provide a fulcrum for the beam, and means constructed and arranged for moving said fulcrum means with respect to the support, means for moving said fulcrum means, with respect to the beam, lengthwise of the beam, and flexible power transmitting means between said two fulcrum moving means for simultaneous adjustment thereof; all as more fully hereinafter set forth and as claimed.

One object of the invention is the provision of an improved walking beam power-transmitting movement for pumps and the like, which is adapted for continuous adjustment of throw, leverage or mechanical advantage by a stationary adjusting means, whereby such adjustment can be performed while the walking beam is in motion, in a convenient and safe manner.

Another object is the provision of an oscillating lever movement, adjustable as to leverage or throw, wherein the only motions taking place at any given position of adjustment, are the simple oscillatory motions of an ordinary pivoted lever; extraneous sliding and oscillatory motions being obviated.

Another object is the provision of an adjustable throw walking beam movement, wherein complicated sliding or oscillatory motions during operation of the apparatus are dispensed with, while full adjustment from zero to maximum throw is attained.

Another object is the provision of an adjustable throw walking beam movement wherein the relative position of the beam with respect to the driving means and the driven means is maintained the same throughout the entire range of adjustment.

In reciprocating machines such as pumps, it is often desired to provide an adjustable reciprocating movement, affording an adjustable leverage, throw or mechanical advantage. For example, in reciprocating pumps it may be desired to provide for a variable stroke, for the purpose of varying the stroke of the pump. One way of accomplishing this is to utilize a walking beam, that is, an oscillatory lever, for operating the pump, and to provide means for varying the leverage of the walking beam. Many expedients have been suggested for doing this, and some have come into use. However, in all cases the variable stroke mechanism leaves something to be desired either in the way of convenience or of efficiency. In some known variable-throw walking beam power transmission apparatus the leverage adjustment means is on the beam itself, so that the machine has to be shut down in order to make an adjustment, or at least the adjustment is rendered dangerous for the operator. In other apparatus, the variable-throw mechanism comprises complicated linkages or sliding blocks which "work" all the time during operation, resulting in excessive wear, and which in some cases throw the beam out of proper alignment with the driving means, or the driven means, in at least some adjustment positions.

According to the present invention there is provided an adjustable-throw walking beam or oscillatory lever movement in which all the stated disadvantages are obviated and new advantages are secured. These objects are achieved by providing a walking beam, having pivot connections with a motor, etc., on the one hand and a pump piston, etc., on the other hand, and a sliding fulcrum for the beam which is arranged to be moved simultaneously with respect to the beam and to a fixed support, by a flexible mechanical transmission, the manual operating means for which is stationary. By virtue of this arrangement the beam always remains in the same position relative to the driving mechanism and the driven mechanism. At any given stroke-setting of the apparatus, the only working joints under load are essentially three pivots, as in the case of ordinary simple walking beams; there are no extra links, slides, etc., working under load.

In the accompanying drawings there is shown, more or less diagrammatically, an example of a specific embodiment of apparatus within the purview of the invention. In the drawings—

Fig. 3 is a view in elevation of the walking beam and sliding block;

Fig. 4 is a view in plan of the sliding block;

Fig. 5 is a view in side vertical section of the walking beam and associated parts; and Fig. 6 is a sectional view of the walking beam and supporting structure.

Figure 1:
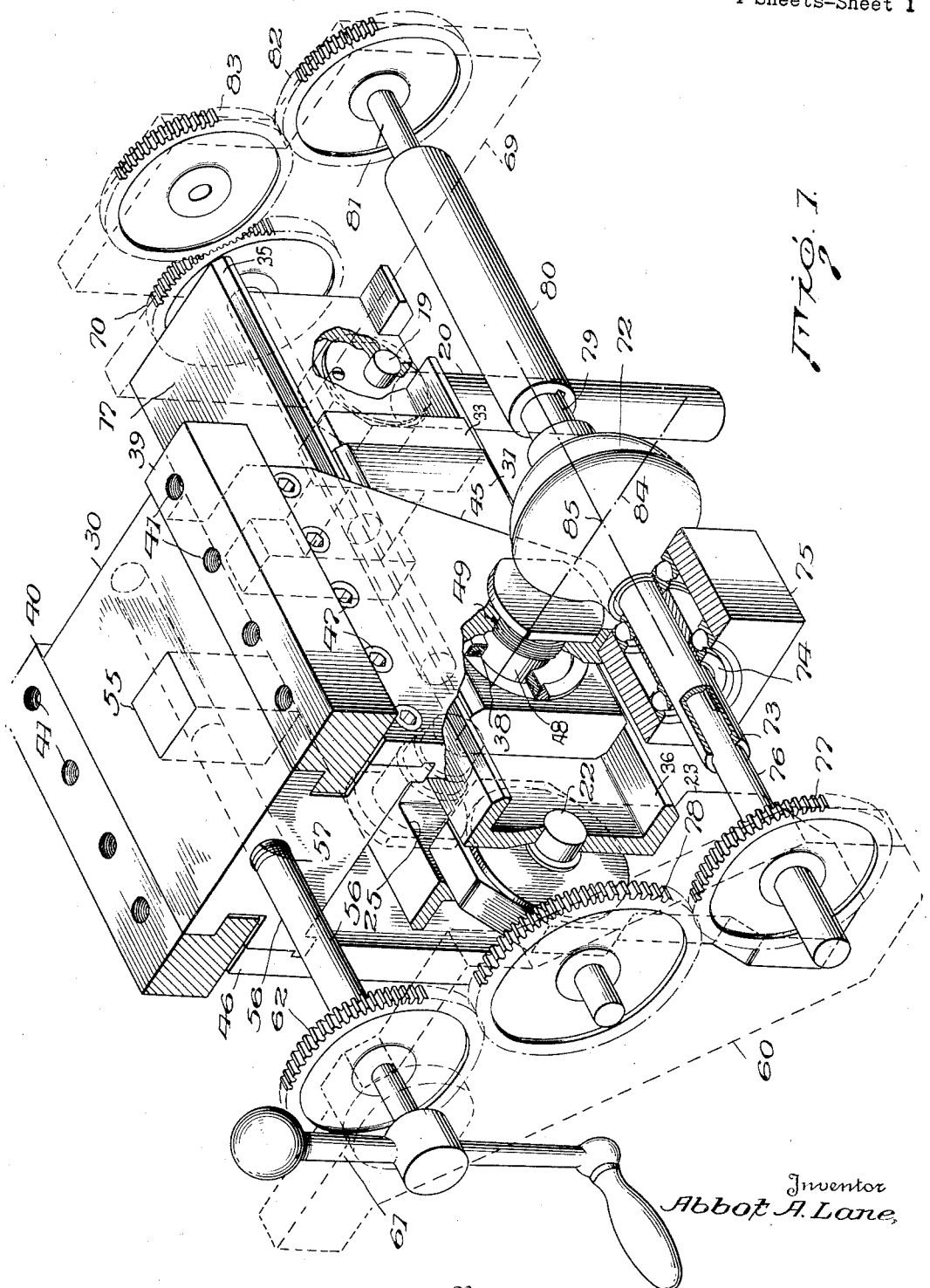
Fig. 1 is a perspective view of the working parts of the mechanism.

Referring to the drawings, the invention is shown (Fig. 2) as applied to a pump, for the purpose of providing a variable stroke movement for the pump. The complete machine comprises a pump cylinder 10, mounted on a base 11 which also carries a speed reducer 12 and an upright or standard 13. The cylinder has a piston rod 14 and cross-head 15 which slides in guides 16, attached to the upright 13. The upper end of the piston rod has an enlarged or T-head 7 engaging grooves 8 in the lower part of the cross-head 15 so that the pump can be replaced with a smaller or larger pump as desired by simply detaching the pump from the base and withdrawing it laterally, without disturbing any other part of the apparatus.

A walking beam 17 is provided, having at its outer or driven end a pivot hole 18 (Fig. 3) for connection, by a pin 19 and anti-friction bearing 9, with a crank arm 20 driven by the speed-reducer (Fig. 2) as shown, so as to move this end of the walking beam up and down. The opposite end of the walking beam is bored at 21 (Fig. 3) for reception of a pin 22 (Figs. 1 and 5) which carries a link 23, an anti-friction bearing 24 being interposed as shown. The end of the walking beam is slotted as indicated at 25 for reception of the link. The lower end of the link is provided with an anti-friction bearing 26, engaging a pin 27 in a fork 28 on the upper end of the cross-head 15.

The walking beam has no fixed intermediate bearing. Instead, a U-shaped sliding block is provided, comprising two slides 31 and 32 identical except for being reversed right and left, and a cross-piece or yoke 33 secured to the slides by screws 34, as shown. The slides move in upper guide rail portions 35 and lower guide rail portions 36 of the walking beam; the walking beam being of I-section as shown in Fig. 6. Each slide has a bore 37 for reception of an anti-friction bearing 38.

Figure 2:
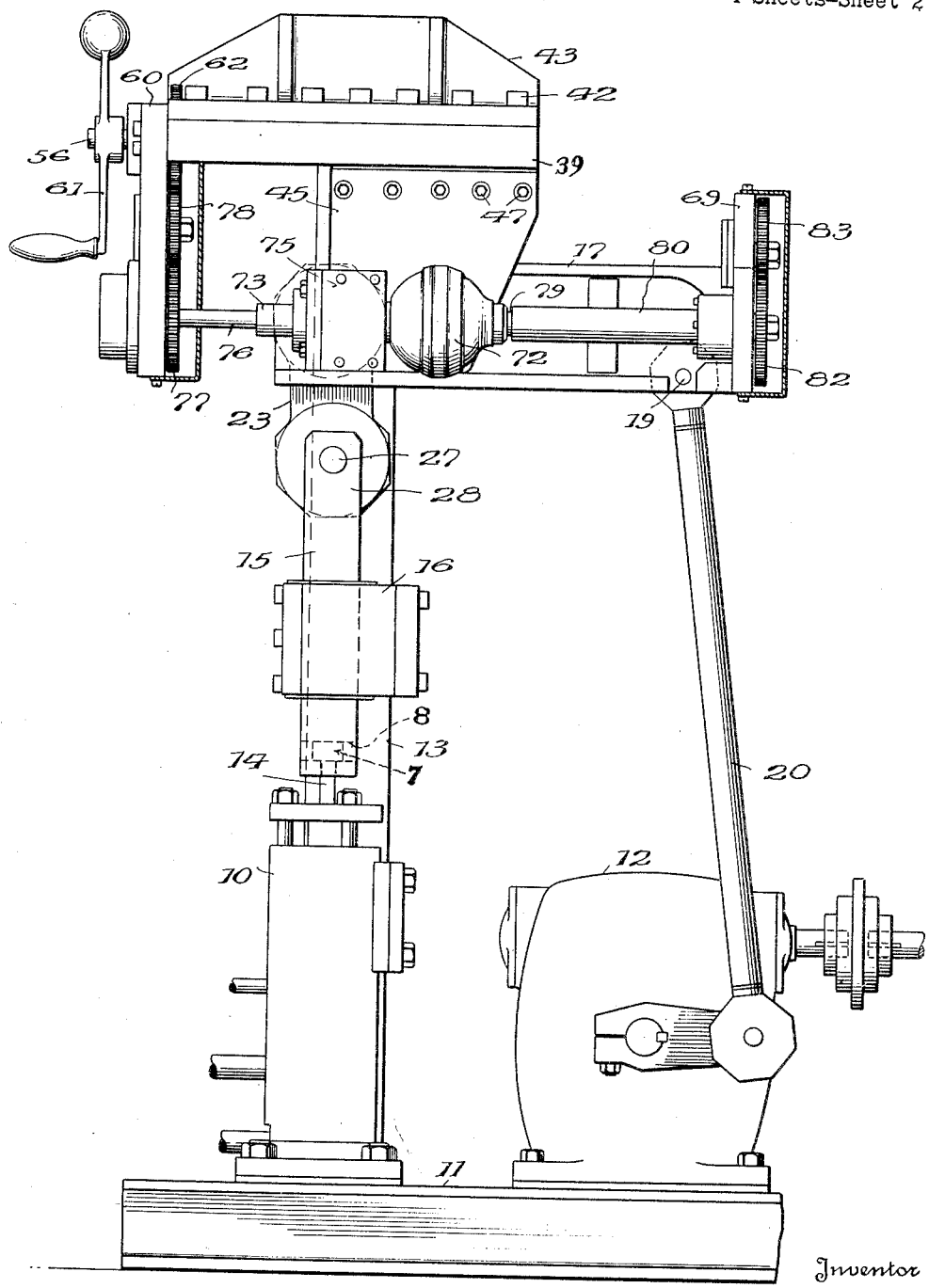
Fig. 2 is a view in elevation of the mechanism applied to a pump.

A sliding fulcrum support is provided comprising a plate 30 arranged to slide in a direction lengthwise of the beam in a pair of guide rails 39 and 40, attached by threaded holes 41 and bolts 42 with a girder-like supporting member 43, which is attached, by means not shown, to the upper end of column 13 (Fig. 1). This girder 43, shown in Fig. 2, is omitted from Fig. 1 for the sake of clarity of presentation. The sliding plate 30 has attached thereto a pair of depending arms or side pieces 45 and 46 (Figs. 1, 2 and 6), by means of socket-screws 47, forming with plate 30 a unitary inverted-U-shaped structure straddling the walking beam as shown. At the lower ends of the side pieces are a pair of stub shafts 48, threadedly attached to the side pieces at 49, and carrying the anti-friction bearings 38, which are socketed in bores 37 of the sliding block, as shown.

It will be seen that the effective throw of the walking beam is determined by the location of the fulcrum (i. e. the axis of shafts 48) with respect to the end pivots of the beam. Means are provided for simultaneously moving the fulcrum with respect to both the walking beam and the fixed support (i. e. girder 43). Thus, plate 30 contains a nut 55 inset therein (Figs. 1 and 6), which is engaged by a threaded shaft 56, extending through a smooth oversize bore 57 in the sliding plate. The outer end of the shaft extends through a vertical plate 60, attached (Fig. 2) at right angles to the girder and guide rail assembly (43, 39, 40). This plate is shown in broken lines in Fig. 1, for the sake of clarity of presentation. The outer end of the shaft carries a handle 61, also a spur gear 62 on the innerside of plate 60. Thus by turning the handle the plate 30 and the parts carried thereby can be moved back and forth in guides 39 and 40.

The sliding block composed of slides 31 and 32 and yoke 33, is arranged to be moved along the walking beam by means of a threaded shaft 63 (Fig. 5) engaging a threaded bore 66 in the yoke, and extending through a smooth oversize bore 67 in the outer part of the beam. A protective sleeve 64 attached to the yoke 33 surrounds the shaft. The beam is slotted, as indicated at 65, to allow longitudinal movement of the cross bar. The outer end of the shaft is retained by an anti-friction bearing 68 in a plate 69 attached at right angles to the beam. This plate is shown in broken lines in Fig. 1 for the sake of clarity. The outer end of the shaft carries a spur gear 70 retained by a nut 71. Thus upon rotation of the gear by means hereinafter described, the sliding block is moved back and forth along the beam.

Shaft 56 is operatively connected with shaft 63 by the following means. A constant-velocity-ratio flexible power-transmitting coupling of any suitable type is provided; the joint is a constant velocity-ratio universal joint 72 such as that described in the patent to Rzeppa No. 2,010,899, the joint having a hollow stub shaft 73 supported for rotation in a bearing 74 and housing 75 attached to the depending arm 45 (Fig. 2). The joint is mounted so that its center lies on the axis 84 of stub shafts 48, as indicated at 85, and the axis of shaft 73 is parallel to guides 39 and 40. A shaft 76, making a sliding drive connection with shaft 73, extends out through plate 60 and carries a spur gear 77, driven through an idler gear 78, by gear 62. The other end of the joint, shaft 79, is connected through a sliding sleeve 80 with a shaft 81 extending through back plate 69 and carrying a gear 82 which meshes through an idler gear 83 with gear 70. The speed ratio between shafts 56 and 63 is 1:1, and the pitches of the threads on these shafts are made the same, and the threads are of the same hand. Therefore, as handle 61 is turned, say clockwise, plate 30 and hence the sliding block (31, 32, 33) is moved rearwardly, while the sliding block is simultaneously moved forwardly by equal increments by screw 63. The result is that the fulcrum of the walking beam is adjusted along the length of the beam, while the beam itself is not displaced in any direction.

In operation, assuming the mechanism to be set in some intermediate position as shown in Fig. 1, upon operation of the crank arm 20 (Fig. 2) the pump piston rod 14 will be operated up and down through some particular stroke distance. Upon turning crank 61 anti-clockwise, the stroke will be increased. The maximum stroke obtainable is when the yoke 33 reaches the end of slot 86; this position is shown in Fig. 5. Zero stroke is obtained by turning handle 63 clockwise until axis 84 of stub shafts 48 coincides with the axis of pin 22, at which position the walking beam simply oscillates about this axis and the piston rod is not reciprocated at all.

Use of a constant-velocity-ratio universal joint as described is advantageous, because in this case there is no oscillation of shaft 73 as shaft 79 moves up and down with the beam. In other words, while one shaft of the joint, shaft 79, continually swings up and down parallel to the walking beam, the other shaft of the joint, shaft 76

73, has no tendency to rotate due to this swinging, which would not be true of an ordinary Hooke's joint. The joint 72 can be a flexible or resilient coupling if desired.

It will be seen that the manual adjusting means, i. e. handle 61 is in a very convenient location, easily accessible and remote from the moving parts. Furthermore, the adjusting means is stationary; it does not move with the beam. Equal angular adjustments of the handle correspond to equal changes in the walking beam fulcrum position.

With the mechanism adjusted for any given stroke, the only moving parts under load during the operation of the pump are the walking beam and its pivots and crank connections; that is to say the only moving parts are those of an ordinary non-adjustable walking beam movement. There are no extraneous complicated linkages, slides, etc., subject to wear. The term walking beam as used herein includes all forms of oscillatory levers of the general character of walking beams, having three fulcra or pivots, for transmitting oscillatory movements.

The apparatus is embodied in steel, bronze or other suitable material. While the movement has been described in connection with pumps, it is useful in various mechanisms where it is desired to provide a lever of adjustable mechanical advantage. The stroke adjusting mechanism is such that the walking beam remains at the same level for all stroke positions; that is to say the adjustment causes no displacement of the beam upwardly or downwardly with respect to the pump or other driven machine. This is an advantage as the pump piston always works in the same region of the cylinder and the cylinder need be no longer than in ordinary fixed-stroke pumps.

What I claim is:

1. A mechanical movement comprising a walking beam, a fixed support, means movable with respect to the support and with respect to the beam in a direction lengthwise of the beam and constructed and arranged to provide a fulcrum for the beam, screw means on the beam for moving said fulcrum means lengthwise of the beam, screw means on the fixed support for moving the fulcrum means with respect to the support, a flexible positive driving connection between said two screw means, and means for operating said driving connection, whereby the fulcrum means can be simultaneously moved with respect to the beam and to the support.

2. A mechanical movement comprising a walking beam, a fixed support, means movable with respect to the support and with respect to the beam in a direction lengthwise of the beam and arranged to provide a fulcrum for the beam, screw means on the beam for moving said fulcrum means with respect to the beam, screw means on the support for moving said fulcrum means with respect to the support, a constant-velocity flexible power-transmitting coupling alined with said fulcrum axis and mounted for rotation on the support, means connecting one side of the coupling with the screw means on the support, and the other side of the coupling to the screw means on the beam, and means for manually operating said first named connecting means.

3. A mechanical movement comprising a walking beam, a fixed support provided with guides extending in a direction lengthwise of the beam, a fulcrum member slidably mounted in the guides, and constructed and arranged to provide a fulcrum for the beam movable lengthwise with respect to the beam, means on the beam for moving said fulcrum member lengthwise with respect to the beam, means on the fixed support for moving the fulcrum member along said guides, and flexible mechanical transmission means between said two fulcrum member moving means.

4. A mechanical movement comprising a walking beam, a fixed support provided with guides extending in a direction lengthwise of the beam, a supporting member slidably mounted in the guides, sliding block means mounted on the beam for sliding motion lengthwise thereof, pivot means connecting the block means and the supporting member so as to form a fulcrum for the beam, means on the beam for moving said sliding block means along the beam, means on the fixed support for moving the supporting member along said guides, and flexible mechanical transmission means between said two supporting member moving means.

5. A mechanical movement comprising a walking beam, a fixed support provided with guides extending in a direction lengthwise of the beam, a supporting member slidably mounted in the guides, screw means for moving the supporting member along the guides, sliding block means mounted on the beam and slidable along the length thereof, screw means for moving the block means along the beam, pivot means connecting the block means and the supporting member so as to form a fulcrum for the beam, and flexible positive mechanical transmission means between said two screw means for simultaneous actuation thereof.

6. A mechanical movement comprising a walking beam, pivot means at each end for connection to driving mechanism and driven mechanism, a fixed support, means movable with respect to the support and with respect to the beam in a direction lengthwise of the beam, and constructed and arranged to provide a fulcrum for the beam intermediate said end pivots and to constrain movement of the beam to oscillation about the fulcrum axis, and means constructed and arranged for moving said fulcrum means, with respect to the support, means for moving said fulcrum means with respect to the beam, and a flexible mechanical transmission connecting said two fulcrum moving means and constructed and arranged for simultaneous movement thereof for varying the effective leverage of the walking beam.

7. In a mechanical movement, a fixed support, a walking beam, a pivot connection at each end of the beam, guide means extending along the beam, a sliding block adapted to slide along said guide means, a supporting member pivotally attached to the sliding block, whereby to provide a fulcrum for the beam, the sliding block and guide means being so constructed and arranged as to permit movement of the fulcrum of the beam into coincidence with the axis of one of said end pivot connections, means for sliding the supporting member with respect to the fixed support, means for sliding the block with respect to the walking beam, and flexible power-transmitting means connected to said two sliding means, for actuation thereof.

8. A mechanical movement comprising an oscillatory lever, fulcrum connections at spaced points on the lever, a fixed support, a member supported by the fixed support and movable with respect thereto in the plane of oscillation of the lever, a member in fulcrum connection with the supported member and carried on the lever and movable lengthwise thereof, means constructed and arranged for moving said first-named member with respect to the support, means for moving said second-named member with respect to the lever, and flexible mechanical transmission means between said two member-moving means, so as to adjust the position of said fulcrum connection between said members, with respect to said fulcrum connections at spaced points on the lever.

9. A mechanical movement comprising an oscillatory lever, a driving fulcrum connection, a driven fulcrum connection and a third fulcrum connection, a fixed support, a member supported by the fixed support and movable with respect thereto in the plane of oscillation of the lever in a direction lengthwise of the lever, a member connected with the supported member by one of said fulcrum connections and carried on the lever and movable lengthwise thereof and so constructed and arranged that in one position thereof on the lever, the axes of two of said three fulcrum connections coincide, whereby in such position the lever transmits zero movement from the driving fulcrum connection to the driven fulcrum connection, and mechanical power transmission means for simultaneously moving said first-named member with respect to the fixed support, and said second-named member with respect to the lever.

ABBOT A. LANE.